Patented June 20, 1939

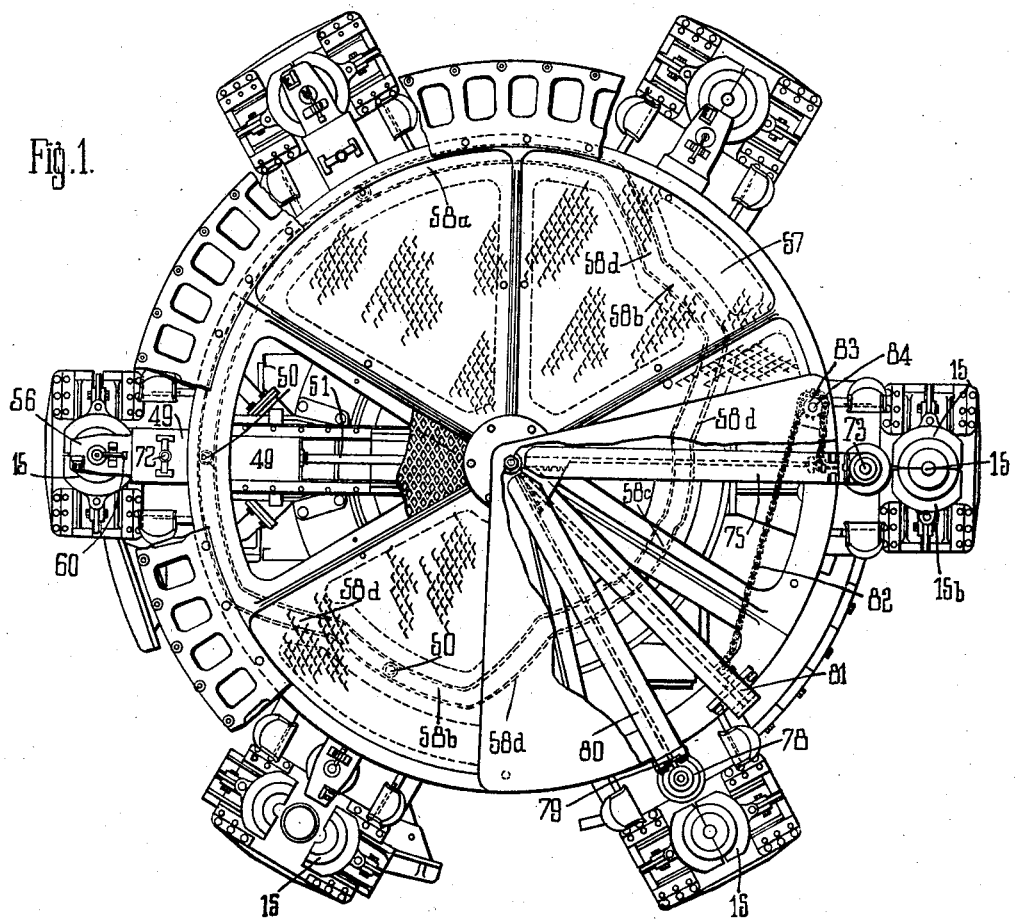

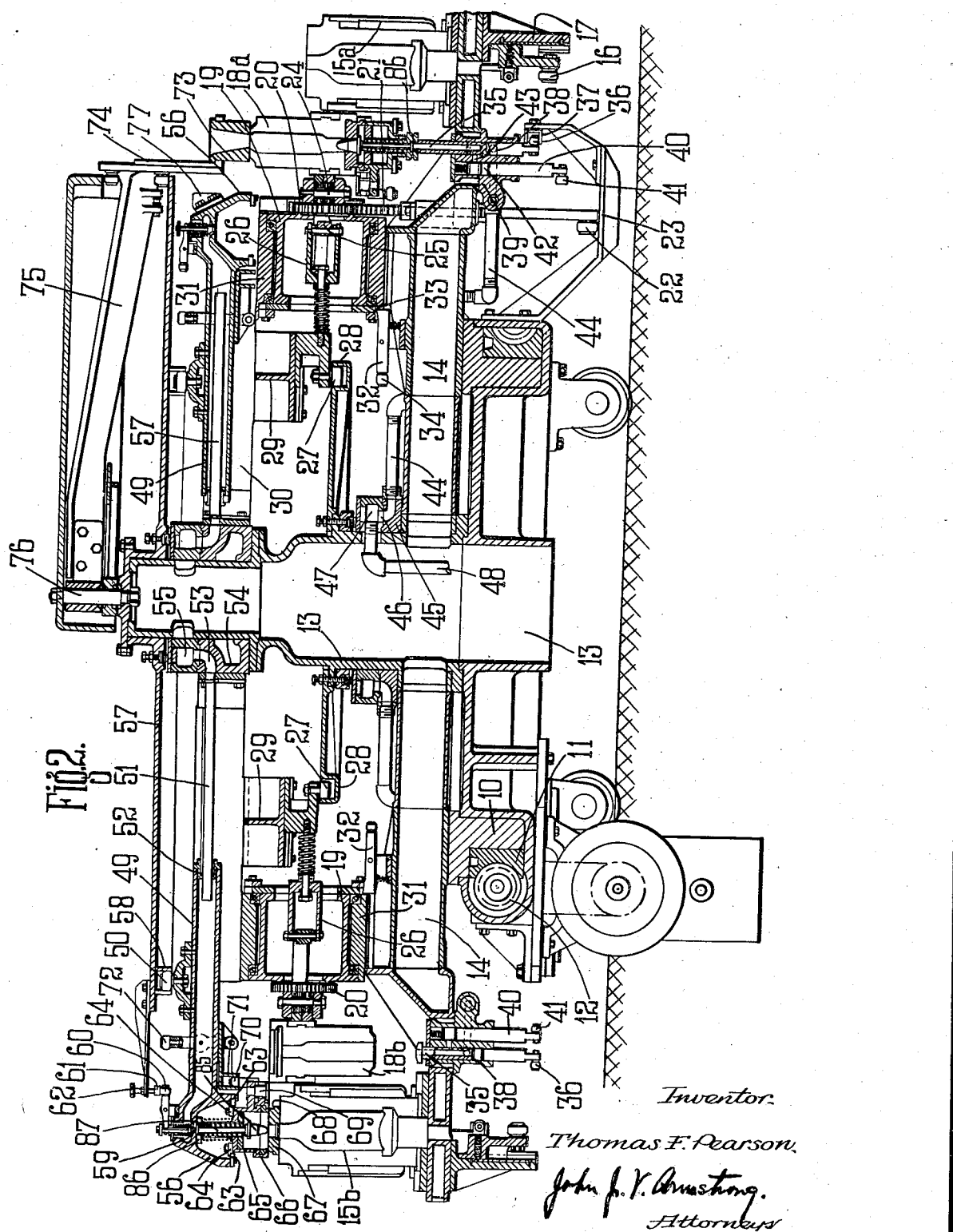

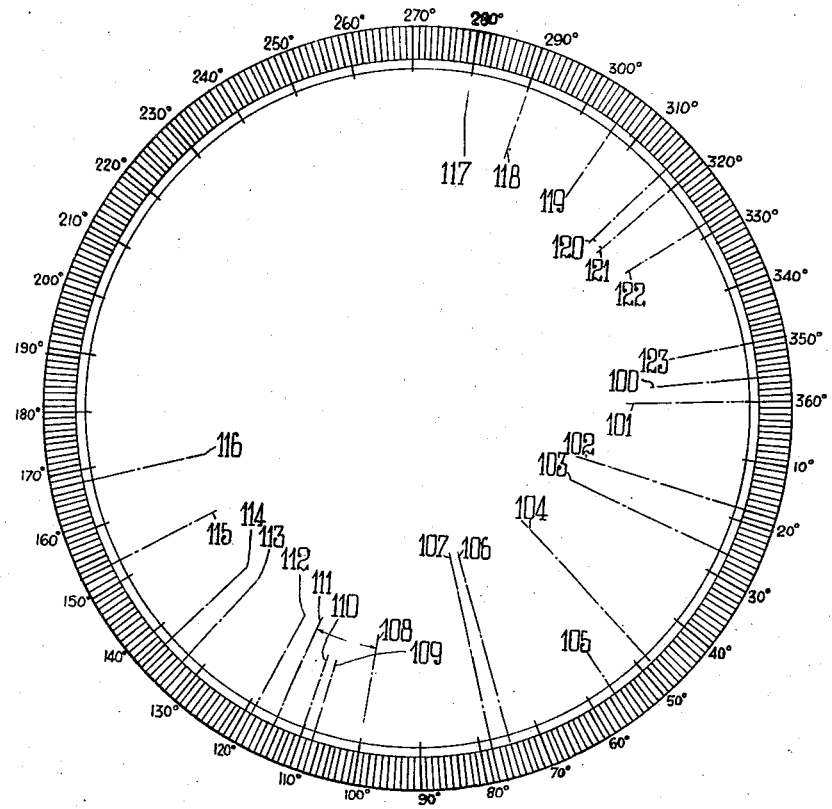

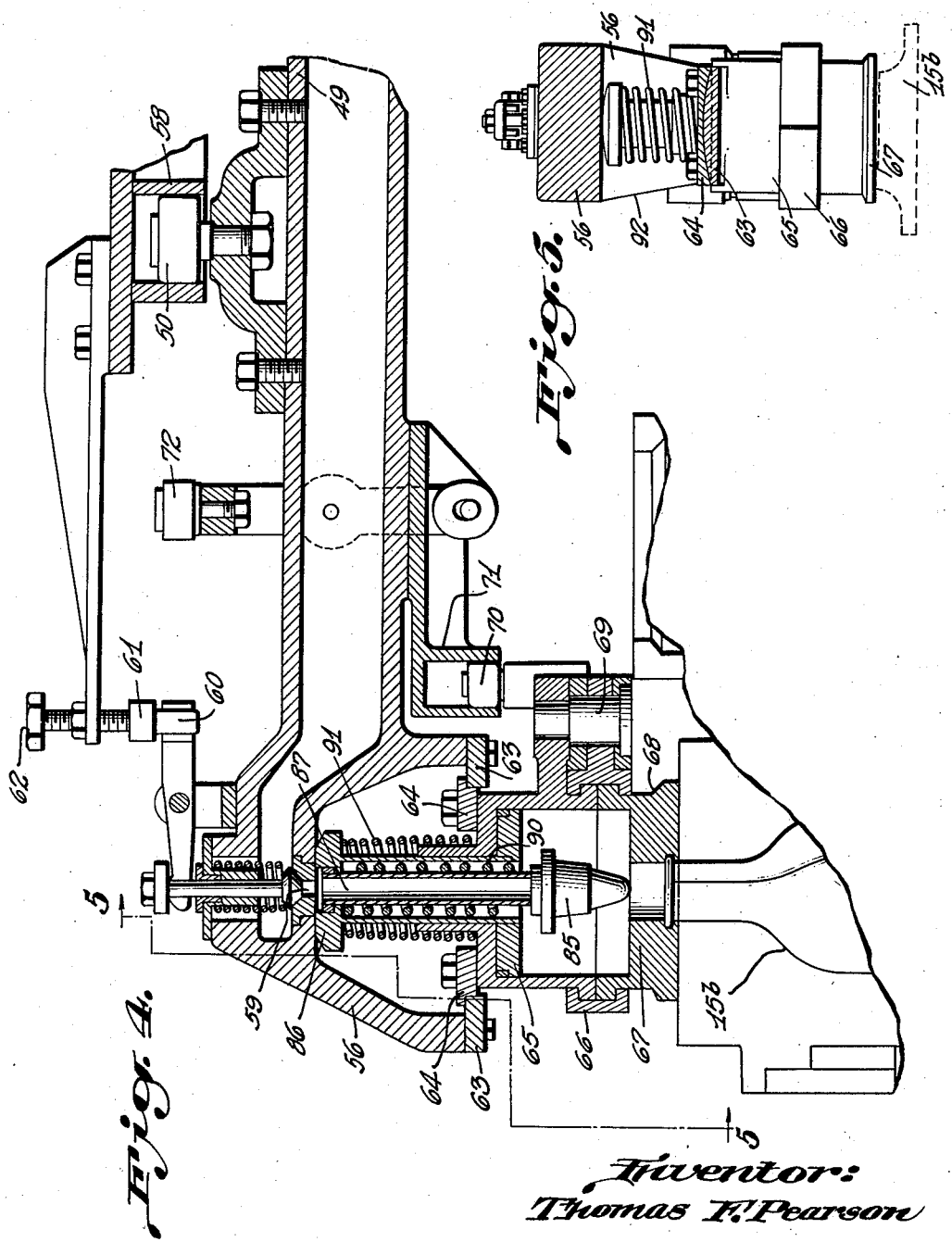

2,163,103

UNITED STATES PATENT OFFICE 2,163,103

FORMING MACHINE FOR GLASS BOTTLES, JARS, AND THE LIKE

Thomas Finney Pearson, Pontefract, England, assignor to Crown Cork & Seal Company, Inc., New York, N. Y., a corporation of New York Application November 18, 1936, Serial No. 111,517
In Great Britain November 30, 1935

11 Claims. (Cl. 49—5)

The present invention relates to forming machines for glass bottles, jars and the like glassware.

The primary object of the present invention is to extend the period of time during which a bottle or other article of glassware, immediately after formation, may be retained in its mould for facilitating cooling, without slowing up the machine.

A further object of the present invention is to provide a relatively high speed machine without affecting certainty of operation in the various steps required to form bottles, jars or the like glassware.

According to the present invention one or more blow moulds and one or more parison moulds are mounted on a table rotatable relative to a support and with the blow moulds having a non-coincident but concentric circumferential path of travel relative to the parison moulds, whereby a bottle may be retained in a blow mould until the actual transfer of a parison from a parison mould is about to be made to its corresponding blow mould and accordingly an angular displacement greater than one complete revolution of the table may be utilised from the time of picking up a charge of molten glass by a parison mould until the finished bottle or jar is delivered from the corresponding blow mould.

It will consequently be seen that where the formation of a bottle, jar or the like has been completed at a predetermined part of the angular displacement of a table carrying the mould parts, the finished bottle, jar or the like may be retained within a blow mould after the co-operating parison mould has picked up a fresh charge and this fresh charge is blown into a parison, the ejection of the finished bottle being effected immediately prior to the transfer of the parison referred to from the parison to the blow mould.

Further by the present invention and from another aspect thereof a slide member adapted for the support of a blow head and a neck mould is reciprocable between the circumferential paths of travel of the parison and blow moulds, whereby said slide member functions as a transfer device for the parison from a parison mould to a blow mould.

Preferably the circumferential path of travel of the parison mould, or the parison moulds where more than one is used, is within the circumferential path of travel of the co-operating blow mould or moulds, whilst the slide member for each co-operating parison and blow mould, in addition to traversing the space between the two circumferential paths of travel is adapted to be displaced towards the axis of rotation of the table for the moulds to enable a parison mould to be inverted to receive a charge.

The invention is more particularly described with reference to the accompanying drawings, in which:

Figure 1 is a plan view of a forming machine constructed according to the present invention, with certain parts broken away wherein glass charges are delivered to the parisons when the latter are in the central position of the right hand half of the drawings.

Figure 2 is a corresponding sectional view in elevation, but with the parison mould turning rack which is associated with the left hand parison, omitted.

Figure 3 is a timing diagram.

Figure 4 is a view on an enlarged scale, showing the transfer arm and blow head.

Figure 5 is a vertical sectional view on line 5—5 of Figure 4.

In the construction according to the drawings a table 10 when coupled with an annulus 11 by means of a clutch is continuously rotated by a worm drive 12 operated from any source of power supply. The table 10 is rotatable about a central hollow column 13 which is stationary, but where the machine as a whole is transportable, is mounted on a wheeled carriage to adjust its working position.

The table carries a number of arms 14 extending radially of the central hollow column 13 which arms act as supports for a series of blow moulds 15, said series, in the construction illustrated, consisting of six blow moulds symmetrically disposed at equal distances apart about the column 13 to move in a circumferential path about the axis of said column on rotation of the table 10.

Each of the blow moulds 15 is formed in two parts 15a, 15b which are adapted to be brought into and out of engagement to close and open the blow moulds respectively under the action of a roller 16 and slide 17, the roller being displaceable at the required periods of time during rotation of the table to open and close the mould halves under the control of a stationary cam track (not shown). For a more specific description of a preferred means for opening and closing the moulds, reference is made to my co-pending application Serial No. 100,943, filed September 15, 1936.

A series of parison moulds 18, similarly six in number, are provided for revolution about the axis of the column 13 with rotation of the table 10, the circumferential path of travel of said parison moulds 18 being on a smaller radius than that of the circumferential path of travel of the blow moulds 15.

Each parison mould is separately mounted on a drum 19 which has a gear wheel 20 at one end thereof adapted for engagement by a rack 21 which is vertically displaceable by means of the engagement of a roller 22 with a cam track 23 whereby on vertical displacement of the roller 22 the drum 19 is angularly displaced through 180° about its own axis to invert its parison mould. For a more specific description of the preferred form of inverting each parison mould reference is made to my copending application Serial No. 100,941 filed September 15, 1936.

Like the blow moulds, the parison moulds 18 are formed by two half portions 18a, 18b which are capable of limited relative displacement to open and close the parison moulds, said half portions being pivoted about a pin 24 carried by the drum 19 on displacement of a wedge 25 and carrier 26 in a direction radially of the axis of the column 13 said radial displacement being effected by a roller 27 engaging within a cam guide 28 which is fixed to the supporting column 13.

For a more specific description of a preferred form of mould opening and closing means, reference is made to my copending application Serial No. 100,945, filed September 15, 1936.

Each roller 27 is carried by a depending bracket 29 of a spoke 30, a series of such spokes continuously rotating with the rotatable table 10. Each drum 19 is mounted in bearings in a casing 31 supported between one of the spokes 30 and the corresponding arm 14 beneath it.

Each drum 19 is prevented from accidental angular rotation about its own axis, until inversion of its parison mould is required, by the action of a locking member 32 which is adapted to engage in a notch 33 of the drum until removed therefrom by the engagement of a roller 34 with a stationary cam track (not shown).

A series of hollow plungers 35 equal in number to, and permanently located beneath, the parison moulds are adapted for rotation with the table 10 about a circumferential path similar to that of the parison moulds, each of said hollow plungers being vertically displaceable by the action of a roller 36 when engaged by a cam track 37. Said cam track 37 has two stepped portions thereon so that when a roller 36 engages with it while passing over one portion of the track it enables the plunger to be dropped to register with a port 38 whilst on engagement of the roller with another portion of the track the latter enables the plunger to be dropped by a further small amount. Each plunger is reciprocable within a mounting 39 on the table, each of said mountings also carrying a vertically reciprocable valve 40 a roller 41 of which engages with a cam track (not shown) to permit a port 42 in the valve to register with a passage 43 in the mounting whereby a vacuum applied through a pipe 44 is communicated to the hollow plunger 35 when the latter is in its raised position, shown at the right in Figure 2. When, however, the plunger 35 is vertically lowered by the roller 36 and track 37 to register with the port 38 pressure is applied to the plunger for the purpose described later.

Each pipe 44 applies vacuum to its plunger 35 through the port 42 and passage 43 and supplies pressure to the plunger directly through the port 38. Each of said pipes 44 is connected to a ported annulus 45 which during rotation with the table and at a predetermined position in its path of rotation registers with a port 46 in a stationary annular chamber 47 which is in communication with a vacuum pipe 48 which extends to any desired source of vacuum.

A series of transfer arms or slide members 49 each carrying a roller 50 is rotated with the table 10 about the axis of the column 13. Each slide member 49 is hollow and lies coaxially with a pipe 51 which passes through a packing gland 52 in the inner end of the slide member. The opposite end of each pipe 51 communicates with a port 53 in a rotating annulus 54, the port 53 at a predetermined interval in its path of travel around the axis of the column 13 being adapted to register with a chamber 55 which is stationary on the column 13 and is in communication with a source of blowing air supply. Each slide arm is displaceable axially of the pipe 51 from one end position shown in the right hand portion of Figure 2 to the other end position which is reached when the member is in the position shown in the left hand portion of the drawings, that is to say, a hollow head 56 at the outer end of each slide member or transfer arm 49 is radially displaceable from a position within the bounding peripheral edge of a stationary cover 57, across the circumferential path of travel of the parison moulds 18 and into a position above the circumferential path of travel of the blow moulds 15.

This radial displacement of the slide member 49 relatively to the axis of the column 13 is effected by means of a cam track 58 on the lower face of the stationary cover 57 and as it is required to radially displace the hollow heads 56 into and out of three circumferential paths, it will be appreciated that the cam track 58 for the rollers 50, at intervals throughout its length, is disposed along arcs 58a, 58b 58c, of different radii with eccentric portions 58d interconnecting the arcs, the radial displacement of the slide member 49 being effected while the rollers travel along the eccentric portions 58d and the members 49 remaining at a fixed distance from the axis of the column 13, but continuing to rotate with the table while the rollers 50 are in engagement with the concentric portions 58a, 58b of the cam track 58. The arc 58c is slightly stepped to provide three parts of slightly different radii for reasons which will be explained later.

A valve 59 is provided in the upper part of each hollow head 56 to provide communication between each pipe 51 and the corresponding hollow head 56, the said valve being displaceable under the action of a roller 60 which is adapted to engage a cam track 61 carried by the cover 57. This cam track 61 may be manually adjusted by means of a handle 62 to take any desired curvature or length so that the degree and period of opening of the valve 59 may be effected at the required predetermined position of rotation of the table 10. For a more complete showing of a preferred form of adjustable cam track, reference is made to my copending application Serial No. 120,075, filed January 11, 1937.

The hollow heads 56 have diametrally opposed gib pieces 63 with convex supporting surfaces adapted for engagement by the lower concave surfaces formed on the flanges 64 attached to the upper ends of the blow heads 65 each of which in turn has a permanent connection with a neck ring holder 66 carrying a neck mould 67 formed of two half portions. Each neck mould is flanged at 68 for engagement with a corresponding flange of a parison mould when the mould sections of a parison mould are closed.

For a more specific description of a preformed form of blow head reference is made to my copending application Serial No. 100,944 filed September 15, 1936.

Each blow head 65 carries a resiliently loaded plunger head 85 which is displaceable relatively to the blow head on the application of suction or pressure, or the application of a load applied to a cap 86 at its upper end. When a parison mould is re-inverted from the position at the right of Figure 2 to the position shown at the left, its blow head 65 is picked up by the corresponding hollow head 56 and is carried thereby. After the parison mould has been opened, the blow head may be shifted to a position above the blow mould by radial outward reciprocation of the slide member 49 and the hollow head 56. A blowing air supply through a pipe 51 and its corresponding hollow slide member 49 and valve 59 may pass downwardly through a hollow spindle 87 of the plunger head, thence through radial passages in the plunger head so as to blow a charge in a blow mould beneath it. When, however, a blow head 65 and neck mould 67 with the plunger head 85 and its hollow spindle and cap are removed as a unit from contact with a hollow head 56 and are engaged by a parison mould to be inverted therewith, both a vacuum and a pressure may be exerted within the blow head whilst the plunger head may be raised relatively to its blow head to enter the neck of a parison at the time of compacting a glass charge in the parison mould in the region of said neck.

Each blow head 65 carries a pivot pin 69, projecting downwardly from a flange formed on the side of the blow head. The half portions of each neck ring mould are pivoted on the pin 69 and are relatively displaceable under the action of a roller 70 on the rear end of each half portion. The rollers 70 are adapted to engage within a holder 71 which is radially displaceable relatively to the axis of the column 13 under the control of a roller 72 which roller in turn is adapted for displacement by a cam track (not shown). When the neck ring and blow head are supported by the end 56 of the transfer arm 49, the neck ring sections are maintained in closed position by the engagement of the rollers 70 within the slot in the holder 71. As pointed out below, when the parison mould opens, leaving the bare parison suspended by the neck ring, prior to the closing of the blow mould around the suspended parison, the neck ring is prevented from opening by the engagement of the rollers 70 in the holder 71. The details of the blow head and neck ring and the operating means therefor are shown more fully in my copending application Serial No. 100,944.

A gathering cup 73 is mounted on a bracket 74 depending from the outer end of a gathering arm 75 which is mounted on a pivot 76 co-axial with the hollow column 13 so as to rotate with the table when one of the slide members 49 is radially displaced outwardly and an abutment 77 thereon engages with the bracket 74 to carry it with it.

A baffle plate 78 (Figure 1) similarly carried by a bracket 79 on an arm 80 is also angularly displaced with the table by virtue of the fact that the arms 75 and 80 are rigidly interconnected. An operating arm 81 is connected to the gathering arm 75 through the medium of a flexible connection such as a chain 82 which passes over a sprocket 83, the axis 84 of which is fixed relative to the stationary cover 57 of the machine. This operating arm 81 has an inwardly projecting abutment (not shown) which is adapted to be engaged by the abutments 77 on the slide members 49.

The operation of the arms 75, 80 and 81 is such that they are angularly displaced to and fro within a quadrant of a circle on continuous rotation of the table, the arms 75, 80 always moving in unison and in an opposite direction to the arm 81. It will be observed that the arms 75, 80 are separated by an angle of 60° in the construction illustrated, which is equal to the separation of the individual parison moulds of the series and in consequence when the gathering cup 73 registers with one parison mould the baffle plate 78 registers with the preceding parison mould, that is to say with the next parison mould immediately in front of it.

For a more specific description of the preferred means for displacing the baffle and gathering cup, reference is made to my copending application Serial No. 100,940 filed September 15, 1936.

The table with its parison moulds 18, blow moulds 15 and slide members 49 moves in a clockwise direction so that while a charge is being picked up by a gathering cup 73 above one parison mould 18 the parison mould in front of it has its upper end closed by the baffle plate 78.

When the arms 75, 80 move a predetermined distance in a clockwise direction with the gathering cups 73 and baffles 78 registering with two of the parison moulds, the particular slide member 49 effecting displacement of the gathering arm 75 is moved radially inwardly by a slight amount from one stepped portion of the arc 58c of the cam track to the central portion of said arc to enable the projection 77 to cease contact with the bracket 74, and to make contact with the arm 81 whereupon the arms 75 and 80 are moved in an anti-clockwise direction to enable the gathering cup 73 to take up a position in registration with the next succeeding parison mould and the baffle plate to take up a position in registration with the parison previously engaged by the cup 73. In the third stepped portion of the arc 58c the roller 50 and the slide member thereof are in a position in which neither the arm 75 nor the arm 81 is engaged by the member 49.

In operating the machine in strict accordance with the timing diagram illustrated in Figure 3 the table rotates continuously and at the position 100 one of the slide arms 49 is radially displaced outwardly under the action of its cam roller 50 to enable the abutment 77 to make contact with the gathering arm 75 whereupon the gathering cup 73 is angularly displaced in synchronism with the table in operative engagement with an inverted parison mould 18 the neck of which has suspended therefrom an inverted blow head and neck ring mould lying co-axial with one of the series of hollow plungers 35. At the position 101 the charge is received by the gathering cup 73 and enters the inverted parison mould beneath it.

During travel of the table to the position 102 the gathering cup 73 is maintained in operative association with the parison mould 18 whilst the cam roller 36 is vertically displaced to bring a plunger 35 into contact with the cap 86 of an inverted plunger head in an inverted blow head. In this position vacuum is applied through the pipe 48, port 45, pipe 44, port 42, passage 43, hollow plunger 35, hollow stem 87 and a plunger head 85. While the gathering cup is travelling from the position 100 to the position 102 the baffle plate 78 associated with the preceding parison mould 18 has a clockwise movement between the positions 105 and 107.

At the position 102 the slide member 49 releases its engagement with the gathering arm whilst at the position 103 the same slide member 49 picks up the operating arm 81, and causes it to travel with it in a clockwise direction until the position 104 is reached when the slide member releases its engagement with the operating arm.

This clockwise movement of the gathering arm causes anti-clockwise or retracting displacement of the gathering cup and the baffle plate to the positions 100 and 105 respectively, so that the gathering cup 73 is ready to pick up a new charge and the baffle plate 78 is ready to close the parison mould to which the charge referred to above has been fed. During the next clockwise movement of the baffle plate between the positions 105 and 107 the plunger 35 suddenly descends to register with the port 38 and permit a pressure supply to be applied to the blow head from the pipe 48 through the same pipe 44 as that through which vacuum was previously applied and thence through the port 38 and the plunger 35, the hollow spindle 87 and blow head 65.

At the position 106 which is reached slightly before the position 107 the drum lock 32 commences to withdraw so that by the time the position 107 is reached the parison mould is in a position in which it can be reinverted. The act of re-inversion of the parison mould is effected between the positions 107 and 109. Simultaneously with the inversion of the parison mould the slide member 49 is radially displaced in an outward direction by its cam roller 50 until the position 108 is reached.

At the position 108 a blow mould 15 containing a blown charge admitted during the preceding revolution of the table is opened, the opening being effected between the positions 108 and 111. Again between the position 108 and 109 the blow head which has been reinverted by the action of the drum 19 on the parison mould 18 associated with said blow head is inserted within the radially advanced open head 56 by the slide member 49, such insertion being completed by the time the position 109 is reached.

Between the positions 109 and 115 transfer of the partially blown parison in the parison mould to a blow mould is effected and as part of this operation the parison mould opens between the positions 112 and 113 whilst between the positions 114 and 115 the transfer arm or slide member 49 which has by this time picked up the blow head 65 and its associated neck ring and the partially blown parison carried thereby conveys said parison to a position co-axial with and in the circumferential path of a blow mould.

It will be understood that the transfer of a formed parison from the parison mould to the blow mould is effected by the slide member 49 and its associated parts. As shown at the right in Figure 2, the blow head and the associated neck mould are supported by the parison mould, by reason of the fact that the neck end of the latter surrounds and embraces the neck mould, which, in turn, is connected to the blow head by the pivot pin 69. When the parison mould is re-inverted, it carries the neck mould and blow head with it. Prior to this action, the slide member has been projected outwardly so that its open end 56 is above the plane of revolution of the parison mould, neck mould and blow head. The cooperating flanges 63, 64 on the open end of the slide member and on the blow head respectively are brought into engagement by this rotation of the parison mould and the parts carried thereby. As shown in Figure 5, the flanges 64, associated with the blow head, lie above and are supported by the member 63 carried at the open end of the slide member. The parison mould opens, leaving the blow head and neck mould thus supported by the slide member, with the bare, hollow parison supported from the neck mould. The slide member is reciprocated outwardly to carry the blow head, neck mould and suspended parison to a position between the open halves of the blow mould. The latter is closed around the supported parison, thus completing the transfer. After the bottle is blown to finished form, the neck ring is opened and the slide member returns the blow head and neck mould to a position above the parison mould, whereupon the neck mould is closed and the parison mould then moved to closed position surrounding the neck mould and supporting it and the associated blow head. Upon inversion of the parison mould, the neck mould and blow head are carried again to the position shown at the right of Figure 1.

When the blow head is first received in the open end 56 of the slide member 49, upon the initial reversion of the parison mould, the rollers 70 mounted on the rear ends of the two halves of the neck mould holders are received in the slot in the member 71. When the parison mould opens to effect the parison transfer, as explained above, the member 71 maintains the neck mould sections in the closed position so that those sections do not open and drop the parison carried thereby. Previously, the neck mould sections had been held in closed position by the parison mould sections which surround them, as shown at the right in Figure 2.

While the transfer of the parison is being effected and the above described cycle of operations is proceeding the blow mould which is about to receive the parison from the parison mould is delivering the finished bottle which it formed during the previous complete rotation of the machine, delivery of such finished bottle being effected between the positions 110 and 114 so that such blow mould by the time the position 115 is reached is ready to receive the blown parison from the corresponding parison mould.

The blow mould under the action of its cam roller 16 closes in travelling from the positions 115 to 116 whilst blowing air is supplied to the open head 56 and associated blow head 65 to blow the parison in the blow mould between the positions 115 and 117.

At the position 117 the neck ring under the action of its cam roller 72 commences to open and completes its opening movement by the time the position 118 is reached, in order to release the article blown in the blow mould. The transfer arm or slide member 49 is radially displaced inwardly to the circumferential path of travel of the parison mould between the positions 118 and 119 and at the position 119 the parison mould commences to close to embrace and pick up the neck ring mould and its associated blow head. Closing of the parison mould is completed by the time the position 121 is reached, but just prior to the position 121, i. e., at the position 120, the drum lock 32 is again withdrawn to permit the parison mould to be inverted.

Between the positions 121 and 122 the blow head 65 is withdrawn from its engagement with the open head 56 of its transfer or slide member 49 by the action of inverting the parison mould, whilst between the positions 122 and 123 the transfer head or slide is radially displaced inwardly out of the circumferential path of travel of the parison moulds. While this is taking place and in fact, between the positions 121 and 123 the parison mould is inverted to be ready to receive the gathering cup 73 for the next cycle of operations in connection with that particular parison mould. A delay then occurs between the positions 123 and 100 before the next charge is picked up.

It will be appreciated that after cut off of the supply of blowing air to the blow mould at the position 117 the blown bottle therein is retained until the position 114 is reached during the next revolution of the table so that in all from the time a charge is picked up at the position 100 at the commencement of one revolution of the table it is not ejected as a finished article until the position 114 of the next revolution is reached, i. e., the operation of blowing and cooling is maintained during an angular displacement of 501° of which 217° represents the cooling period for the charge.

I wish to emphasize, however, that the timing of the machine may be varied within practical requirements that is to say, that the timing diagram is given as an example and shall not be regarded as a limitation of my invention.

It will also be appreciated that in the description of the operation of the machine, the action of one parison mould and its cooperating blow mould is described. A similar action on each of the six parison and blow moulds in turn is effected at intervals of sixty degrees throughout the rotation of the table, so that the use of six parison and blow moulds with six transfer arms and their associated mechanisms simply mean that the blown glassware produced by the machine is six times the number produced by a machine having a single parison, blow mould and transfer member. From this it follows that any number of moulds may be provided to constitute the series carried by the table.

I declare that what I claim is:

1. A forming machine for blown glassware comprising a rotatable table, a series of parison moulds in circumferentially spaced relation thereon, a series of blow moulds in circumferentially spaced relation thereon and mounted for movement along a path non-coincident but concentric with the path of travel of the parison mould, a slide member, a blow head and neck mould assembly adapted to be secured to and carried by one of the parison moulds of said series when said mould is in closed position, means for moving the slide independently of said assembly when the latter is so supported, means associated with the slide member for supporting said assembly and a parison suspended in the neck mould when said parison mould opens, means for moving the slide member and the assembly supported thereby relative to said parison mould and into a position in alignment with one of the blow moulds of said series, and means for closing said blow mould about the suspended parison upon completion of such movement.

2. A forming machine for blown glassware comprising a rotary table, a stationary support for said rotary table, means for rotating said table relatively to said support, a series of parison moulds in circumferentially spaced relationship on said rotary table and adapted to receive glass charges in succession, a series of blow moulds in circumferentially spaced relationship on said table for displacement therewith but about a greater radius than that of said series of parison moulds, a series of slide members, a series of blow heads, a series of neck moulds co-operating with said blow heads, means associated with said parison moulds for engaging and subsequently releasing said blow heads and said neck moulds, means for closing one end of each parison mould in succession while the parison moulds are so engaged with said blow heads and neck moulds, means for partially blowing the charges into parisons in said parison moulds, means on said slide members for engaging and subsequently releasing said blow heads and said neck moulds, means for radially displacing said slide members across the circumferential path of said parison moulds to a position to engage said blow heads and neck moulds carrying the parisons, and to convey them to a position coincident with the path of said blow moulds, means for operatively connecting said blow heads and neck moulds to said blow moulds, and means for blowing said parisons into finished articles in said blow moulds.

3. A forming machine for blown glassware comprising a rotary table, a stationary support for said rotary table, means for rotating said table relatively to said support, a series of parison moulds in circumferentially spaced relationship on said rotary table, means for inverting said parison moulds, means for supplying glass charges to said parison moulds in succession when inverted, a series of blow moulds in circumferentially spaced relationship on said table for displacement therewith but about a greater radius than that of said series of parison moulds, a series of slide members, a series of blow heads, a series of neck moulds co-operating with said blow heads, means for engaging said blow heads and said neck moulds with said parison moulds for inversion therewith, means for applying a vacuum to said blow heads to compact the charges in said parisons when inverted, means for closing the bases of said parison moulds, means for blowing said charges into parisons in said parison moulds while closed, means on said slide member for engaging with said blow heads and said neck moulds when said parison moulds are upright, means for radially displacing said slide members across the circumferential path of said parison moulds to pick up said blow heads and neck moulds with said parisons and convey them to a position coincident with the path of said blow moulds, means for operatively connecting said blow heads and neck moulds to said blow moulds, and means for blowing said parisons into finished articles in said blow mould.

4. A forming machine for blown glassware comprising a rotary table, a stationary support for said table, means for continuously rotating said table about said support, a series of parison moulds on said table, a series of blow moulds on said table disposed at a different radius from the centre of said table than said parison moulds, a series of blow heads and neck moulds, a series of hollow slide members on said table, each of said slide members having means to releasably engage and support a corresponding blow head and neck mould, means for displacing said slide members independently radially of said table during their rotation therewith to transfer the engaged and supported blow heads and neck moulds from association with said parison moulds to association with said blow moulds, and means for providing a blowing air supply through said radially displaceable hollow slide members to said neck moulds and blow heads when in engagement with said blow moulds.

5. A forming machine for blown glassware comprising a rotary table, a support for said table, means for rotating said table continuously about said support, a series of parison moulds in circumferentially spaced relationship on said rotary table, means for inverting said parison moulds in succession at predetermined positions of their path, a series of blow moulds in circumferentially spaced relationship on said table but disposed at a radius different from that of the parison moulds, means for guiding glass charges into said parison moulds when the latter are inverted, means for blowing said charges into parisons in said inverted parison moulds, transfer means displaceable radially of said table for picking up said parisons in succession from said parison moulds when the latter are upright and conveying said parisons to said blow moulds, and means for blowing said parisons into finished articles in said blow moulds.

6. A forming machine for glassware including a neck mould, a body mould, a finishing mould, means to rotate said body and said finishing moulds at different radial distances about a common axis, means to feed glass to said body mould, means to partly form glass in said body mould, means to periodically displace said neck mould radially to lie in the path of the finishing mould, and means to turn said neck mould through 180° in a plane normal to its radial displacement.

7. A forming machine for blown glassware comprising a rotatable table, a plurality of pairs of parison and blow moulds, the moulds of each pair being spaced in radial alignment on the table, means for opening and closing the moulds, means for inverting and re-inverting each parison mould, a combined blow head and neck mould assembly adapted to be embraced and carried by the parison mould when the latter is closed, a transfer arm above the level of the moulds, said arm having surfaces shaped and positioned to receive and support said blow head and neck mould assembly upon re-inversion of the parison mould to upright position and upon disengagement of said assembly by the parison mould, means for moving the transfer arm and the neck mould and blow head assembly radially of the table to a position overlying the blow mould, said blow mould being closable in alignment with the neck mould supported by the transfer arm.

8. A forming machine for blown glassware comprising a rotatable table, a plurality of pairs of parison and blow moulds, the moulds of each pair being spaced in radial alignment on the table, means for opening and closing the moulds, means for inverting and re-inverting each parison mould, a combined blow head and neck mould assembly adapted to be embraced and carried by the parison mould when the latter is closed, air connections below the parison mould positioned to register with the blow head when the latter is inverted with the parison mould, means for applying suction through said connections and said blow head to compact a charge in the parison mould and neck mould, means for subsequently blowing air through said connections and said head to blow the charge into a formed parison, a transfer arm above the level of the moulds, said arm having surfaces shaped and positioned to receive and support said blow head and neck mould upon re-inversion of the parison mould and disengagement of said assembly when the parison mould opens, means for moving the transfer arm radially to a position overlying the blow mould, and means for blowing the parison to finished form in the blow mould after the latter has closed.

9. A forming machine for blown glassware comprising a rotatable table, a plurality of pairs of parison and blow moulds, the moulds of each pair being spaced in radial alignment on the table, means for opening and closing the moulds, means for inverting and re-inverting each parison mould, a combined blow head and neck mould assembly adapted to be embraced and carried by the parison mould when the latter is closed, air connections below the parison mould positioned to register with the blow head when the latter is inverted with the parison mould, means for applying suction through said connections and blow head to compact a charge in the parison mould and neck mould, means for subsequently blowing air through said connections and said head to blow the charge into a formed parison, a transfer arm above the level of the moulds, said arm having surfaces shaped and positioned to receive and support said blow head and neck mould upon re-inversion of the parison mould and disengagement of said assembly when the parison mould opens, means for moving the transfer arm radially to a position overlying the blow mould, air connections associated with said transfer arm, and means for blowing air through said connections and said blow head to blow the parison to finished form in the blow mould after the latter has closed.

10. A glassware forming machine comprising an invertible parison mould, a blow mould spaced therefrom, means for opening and closing the moulds, a neck mould assembly, a transfer arm above said moulds, said neck mould assembly being embraced and supported by said parison mould when the latter is closed and released thereby when opened, said transfer arm having surfaces shaped and positioned to engage a part associated with said assembly to support the same when the parison mould is re-inverted from neck down to neck up position and then opened, and means to move the transfer arm to bring the neck mould assembly to a position in alignment with the blow mould.

11. A glassware forming machine comprising an invertible parison mould, a blow mould spaced therefrom, means for opening and closing the moulds, a neck mould assembly, a hollow transfer arm above said moulds, blowing air connections associated with said arm, and means to move the arm relative to said moulds, said neck mould assembly being embraced and supported by said parison mould when the latter is closed and released therefrom when opened, said transfer arm having surfaces shaped to engage said assembly to support the same when the assembly is swung into engagement therewith upon re-inversion of the parison mould from neck down to neck up position, the movement of the transfer arm serving to transfer the neck mould assembly to a position in alignment with the blow mould, wherein a parison supported in the neck mould may be blown to finished form by air flowing through said hollow transfer arm and said connections.

THOMAS FINNEY PEARSON.